United States Patent
Bang

[19]

[11] Patent Number: 6,005,728

[45] Date of Patent: Dec. 21, 1999

[54] DISK RECORDING MEDIUM FOR EMBODYING HIGH CAPACITY HARD DISK DRIVE

[75] Inventor: Ho-Yul Bang, Suwon, Rep. of Korea

[73] Assignee: SamSung Electronics Co., Ltd., Kyungki-do, Rep. of Korea

[21] Appl. No.: 08/704,859

[22] Filed: Aug. 28, 1996

[30] Foreign Application Priority Data

Aug. 28, 1995 [KR] Rep. of Korea ............ 95-26969

[51] Int. Cl.$^6$ ............................................. G11B 5/09
[52] U.S. Cl. ............... 360/49; 360/48; 360/135; 360/77.08; 360/78.14
[58] Field of Search ............... 360/49, 48, 135, 360/77.08, 78.14

[56] References Cited

U.S. PATENT DOCUMENTS

| | | |
|---|---|---|
| 4,631,606 | 12/1986 | Sugaya . |
| 4,636,885 | 1/1987 | Yamada et al. . |
| 4,823,212 | 4/1989 | Knowles et al. . |
| 4,984,100 | 1/1991 | Takayama et al. . |
| 5,274,510 | 12/1993 | Sugita et al. . |
| 5,400,201 | 3/1995 | Pederson . |
| 5,418,657 | 5/1995 | Machado et al. . |
| 5,420,730 | 5/1995 | Moon et al. . |
| 5,500,848 | 3/1996 | Best et al. .................... 360/48 |
| 5,515,212 | 5/1996 | Chiao et al. . |
| 5,523,903 | 6/1996 | Hetzler et al. . |
| 5,526,211 | 6/1996 | Hetzler . |

*Primary Examiner*—Alan Faber
*Attorney, Agent, or Firm*—Robert E. Bushnell, Esq.

[57] ABSTRACT

A disk recording medium includes a servo track pattern where a gray code field has been deleted, capable of embodying a high capacity hard disk drive. The hard disk drive which uses as a recording medium, a disk having a plurality of servo sectors for each track, includes: a first plurality of servo track patterns on each track, the number of first servo track patterns equal to the total number of first servo sectors existing on each track divided by the number of heads of the hard disk drive, each of the plurality of servo track patterns having a gray code field for providing information for each track; and a second plurality of servo track patterns on each track, the number of second servo track patterns equal to the total number of servo sectors existing on each track minus the number of first servo track patterns, each of the second plurality of servo track patterns corresponding to the first servo track pattern but with the gray code field deleted.

3 Claims, 4 Drawing Sheets

DISK RECORDING MEDIUM FOR EMBODYING HIGH CAPACITY HARD DISK DRIVE

CLAIM OF PRIORITY

This application make reference to and claims all benefits accruing under 35 U.S.C §119 from an application entitled DISK RECORDING MEDIUM FOR EMBODYING HIGH CAPACITY HARD DISK DRIVE AND SERVO CONTROL METHOD PERFORMED THEREBY earlier filed in the Korean Industrial Property Office on Aug. 28, 1995 and assigned Korean Application No. 26969/1995.

BACKGROUND OF THE INVENTION

1. Field of the Invention

The present invention relates to a servo control in a hard disk drive (hereinafter, referred to as an HDD) and, in particular, to a disk recording medium comprising a plurality of servo track patterns in order to embody a high capacity hard disk drive and a servo control method performed thereby.

2. Description of the Related Art

Conventionally, an HDD which is widely used as an auxiliary memory of a computer system, is generally constructed with a read/write channel for reading data stored on a disk and for converting the read data, i.e., converting an analog signal into a digital signal, a microprocessor for communicating with a host computer and for performing an overall control operation of the HDD system, and a servo controller for moving a head to a specific position on the disk. Using a servo control, the HDD constructed as described above operates in a track seek mode and a track following mode, in accordance with a moving distance of an actuator. The track seek mode moves the actuator to a target track and the track following mode controls the head of the actuator while placed on the target track, so that the head lies on-track. In the conventional HDD, a velocity control of the actuator is effected in the track seek mode, and a position control is effected in the track following mode. The disk used as a recording medium of the HDD is divided into a number of tracks where a servo sector and a data sector are alternately arranged such that about 9~10% of the entire capacity of the disk is utilized as the servo sector.

Typically, the track for each head on a platter and a hard disk drive using a multiple platter arrangement includes a data sector having a ID field and a data field and a servo sector consisting of preamble, a servo address mark, a gray code field for providing the information for each track number and a plurality of servo bursts for providing position error signals required for operation of the track seek mode and the track following mode. Lastly, a PAD field is provided to give a transition margin from the servo sector to the data sector.

The patents to Hetzler, U.S. Pat. No. 5,523,903, BANDED MAGNETIC RECORDING DISK WITH EQUALLY-ANGULARLY-SPACED SERVO SECTOR, Hetzler, et al., U.S. Pat. No. 5,526,211, SECTOR ARCHITECTURE FOR FIXED BLOCK DISK DRIVE, Machado, et al., U.S. Pat. No. 5,418,657, TRACK ADDRESS DETECTING MEANS BY HDD SECTOR SERVO METHOD, and Chiao, et al., U.S. Pat. No. 5,515,212, VERY-HIGH DENSITY DISKETTE FORMAT METHOD AND COMPUTER IMPLEMENTED PROCESS, each discloses prior art disk drive arrangements having formats similar to those noted above.

None of the cited art has been able to reduce the size of the servo sector by eliminating the gray code field from some of the servo sectors in each track as in the present invention so as to increase the density on the hard disk drive as in the present application.

SUMMARY OF THE INVENTION

It is therefore an object of the present invention to provide a disk recording medium including a servo track pattern where a gray code field has been deleted, capable of embodying a high capacity HDD.

It is another object of the present invention to provide a servo control method of a HDD which uses as a disk recording medium, a disk having a servo track pattern where a gray code field has been deleted, capable of embodying a high capacity HDD.

These and other objects can be achieved according to the present invention with a servo control method of an HDD comprising: providing a disk having a plurality of first servo track patterns including a gray code field for providing track information for each track, and a plurality of second servo track patterns which fail to include the gray code field of the first servo track patterns, both the first and second track patterns being positioned on the same track; providing a head for reading the data from a given track of the disk or writing the data on the given track; checking, in response to a data read/write command received from a host computer, whether or not the head must move to a target track; if it has been determined that the head must move to the target track, repeatedly switching a head number following the head switched at present, in a sequential manner, thereby performing a track seek; after performing the track seek, checking whether or not a velocity of the head is decreasing; if it has been determined that the velocity of the head was decreasing, fixing the head on the disk including the target track, thus performing the track following.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENT

Figure 1:
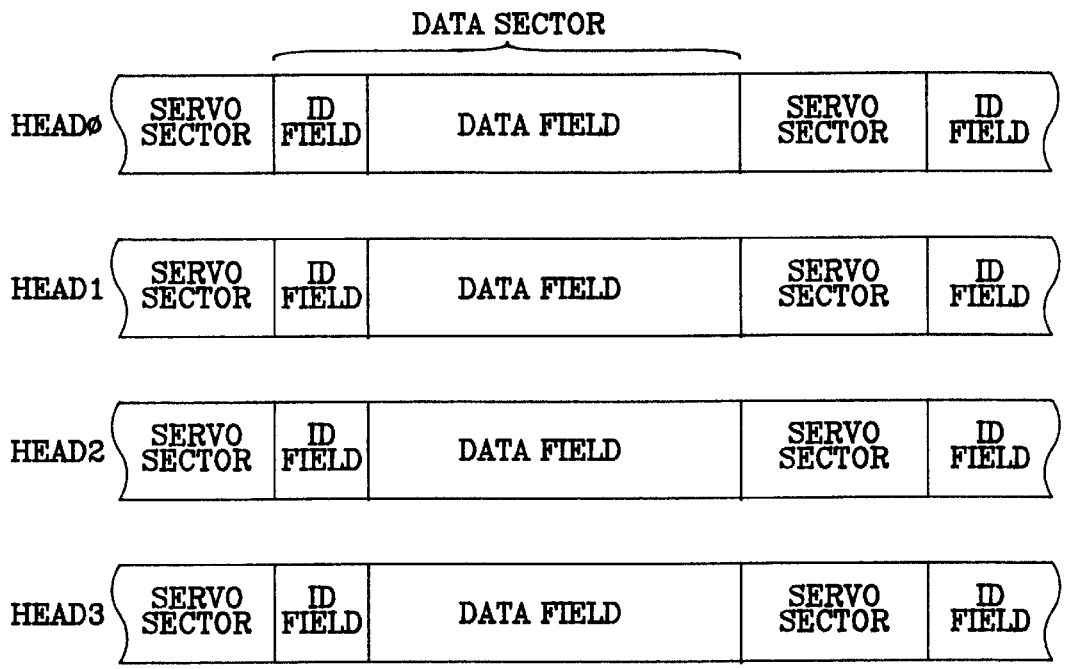
FIG. 1 illustrates sector formats for each head wherein a servo sector and a data sector are alternately arranged.

Throughout the drawings, it is noted that the same reference numerals of letter will be used to designate like or equivalent elements having the same function. Further, in the following description, numerous specific details are set forth to provide a more thorough understanding of the present invention. It will be apparent, however, to one skilled in the art that the present invention may be practiced without these specific details. A detailed description of known functions and constructions unnecessarily obscuring the subject matter of the present invention has been omitted in the following description for clarity.

FIG. 1 shows the sector formats for given tracks on platters in correspondence with each head (head$\phi$, head 1, head 2, and head 3) in the HDD using a multiple platter system. As shown in FIG. 1, a servo track pattern written for each servo sector is written with a bank writing mode or with a parallel writing mode. The data sector of FIG. 1 is typically divided into an ID (identification) field and a data field. Header information for identification of the corresponding data sector is written in the ID field, and the digital data is written in the data field. The servo track pattern of FIG. 1 is written in the servo sector positioned before and after the data sector as illustrated in FIG. 2.

Figure 2:
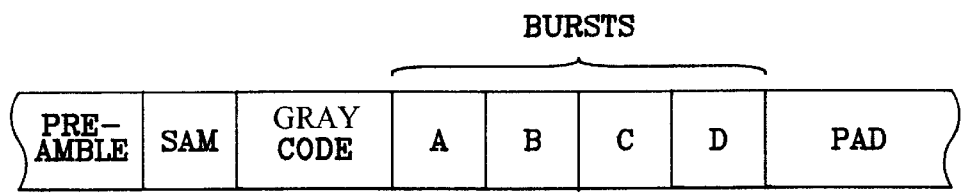
FIG. 2 illustrates a servo track pattern written in the servo sector of FIG. 1.

With reference to FIG. 2, the servo sector includes a preamble, a servo address mark (hereinafter, referred to as a SAM), a gray code field, servo bursts (A, B, C and D) and a PAD field. Upon reading the servo information, the preamble provides a clock synchronization and also provides a gap before the servo sector. The SAM indicates the start of the servo control and to read the gray code field following the SAM. That is, the SAM provides a reference point for generating all kinds of timing pulses related to the servo control. Further, the gray code field provides the information for each track number and the servo bursts (A,B,C and D) provide position error signals (hereinafter, referred to as PES) required for operation in the track seek mode and the track following mode. The PAD field is to provide a transition margin from the servo sector to the data sector. As an example, a servo control technique for a HDD comprised of a disk having 72 servo sectors per track where the servo track patterns are written and a spindle motor for rotating the disk at a constant speed of 4500 RPM, is described below.

Once a data read/write command is received from an external device (e.g., the host computer), the microprocessor checks whether or not a track seek must be performed. When it has been determined that a track seek must be performed, the microprocessor switches to the track seek mode, to perform the track seek mode. The head located at the surface of the disk including the target track, is selected by a head switching operation. After controlling the head to lie on-track of the target track using the servo information which is sensed at every sampling via the selected head by the head switching operation, the microprocessor performs the read/write operation. In this case, each PES for all of the 72 servo sectors is required for sampling every servo sector. Since the gray code field always exists in usual servo track patterns, the gray code field is recorded and a sampling value read whenever the servo sampling is performed. As a consequence, the number or the length of the servo sectors in the high capacity HDD cannot be reduced.

Figure 3:
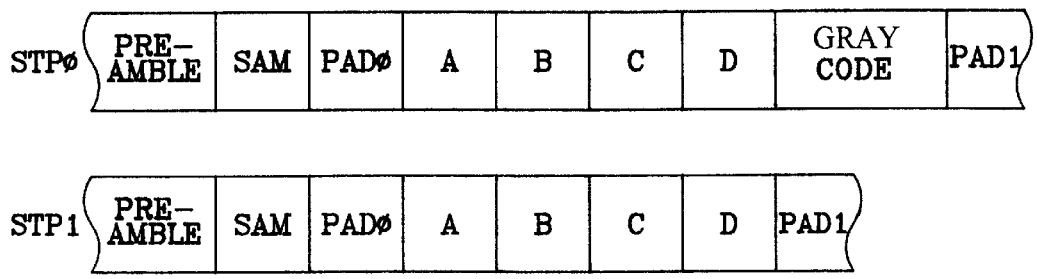
FIG. 3 illustrates a servo track pattern according to an embodiment of the present invention.

With regard to FIG. 3, the servo track pattern according to a embodiment of the present invention, is comprised of a first servo track pattern STP$\phi$ wherein track information for each track is written and a second servo track pattern STP 1 where a gray code field corresponding to the first servo track pattern STP$\phi$ has been deleted. With reference to FIG. 3, the first servo track pattern STP $\phi$ has the same construction as the servo track pattern as illustrated in FIG. 2, except that the positions of the gray code field and the servo burst (A,B,C and D) are reversed. The second servo track pattern STP 1 has the same construction as the first servo track pattern STP$\phi$ but the gray code field has been deleted. The PAD$\phi$ field is the minimum timing margin required to generate the timing pulse for reading the servo burst signal, and the PAD1 field is the transition margin from the servo sector to the data sector.

Figure 4:
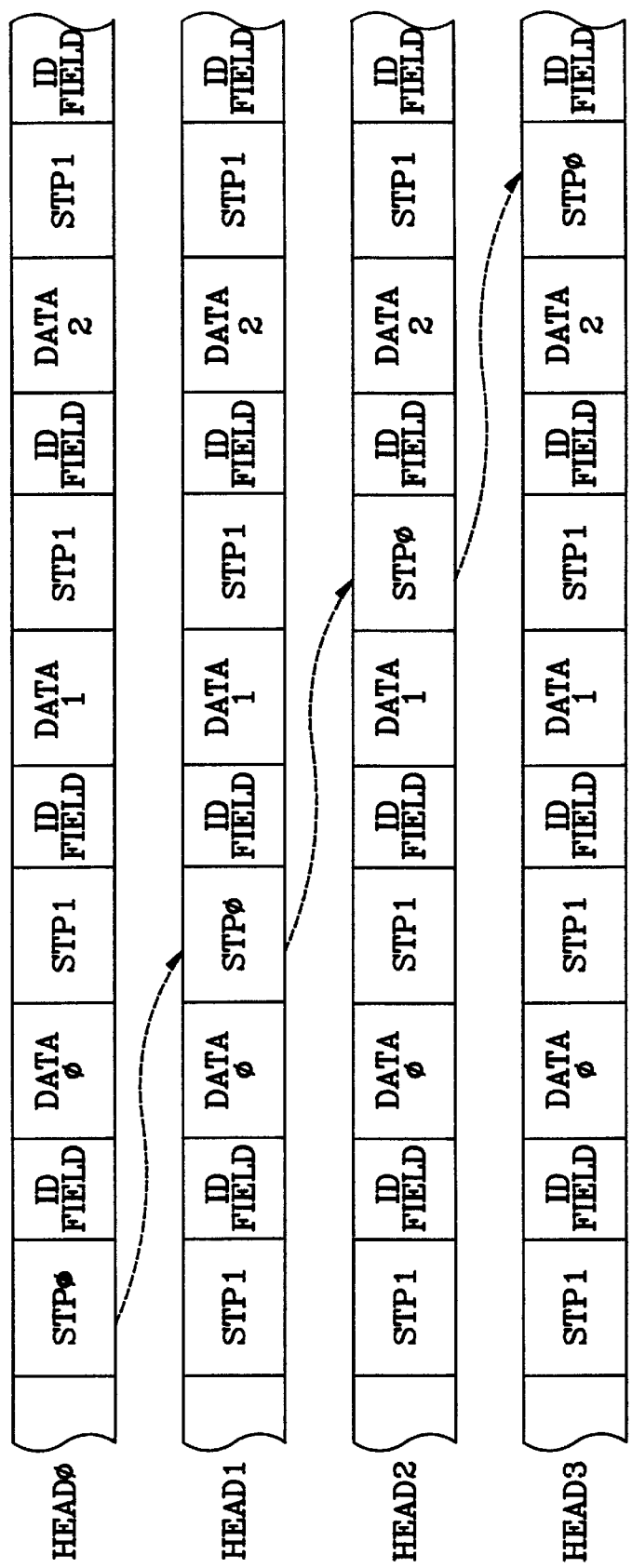
FIG. 4 illustrates sector formats for each head according to an embodiment of the present invention.

FIG. 4 illustrates sector formats for each head according to an embodiment of the present invention, wherein the first and second servo track patterns STP$\phi$ and STP 1 are conventionally written on the disk. An explanation of the steps of setting the number of first and second servo track patterns STP$\phi$ and STP 1 which are written on the surface of each track is provided below.

Assuming that two disks are used as the disk recording medium of the HDD according to an embodiment of the present invention and assuming that each track arranged concentrically on the disk has 72 servo sectors, the number of first servo track patterns STP$\phi$ is made equal to the total number of servo sectors existing on the each track divided by the number of heads. The number of second servo track patterns STP 1 is made equal to the total number of servo sectors existing on each track minus the number of first servo track patterns STP$\phi$. In the embodiment of the present invention, 18, (that is 72/4) first servo track patterns STP$\phi$ and 54 (that is 72–18) second servo track patterns STP$\phi$ are written on the servo sector of each track. The servo sector where the first servo track patterns STP$\phi$ and the second servo track patterns STP 1 are written, can be set with a consequential method embodied as an embodiment of the present invention.

Primarily, the number of servo sectors existing on each track is divided by the number of heads. If the first servo track pattern STP$\phi$ is written in the servo sector wherein the head number is the same as the remainder after division by the number of heads, and the second servo track pattern STP 1 is written in the remaining servo patterns except for the above servo sector, the servo sector on the given track which corresponds to each head (head$\phi$, head 1, head 2 and head 3) has the servo track pattern as shown in FIG. 4.

Figure 5:
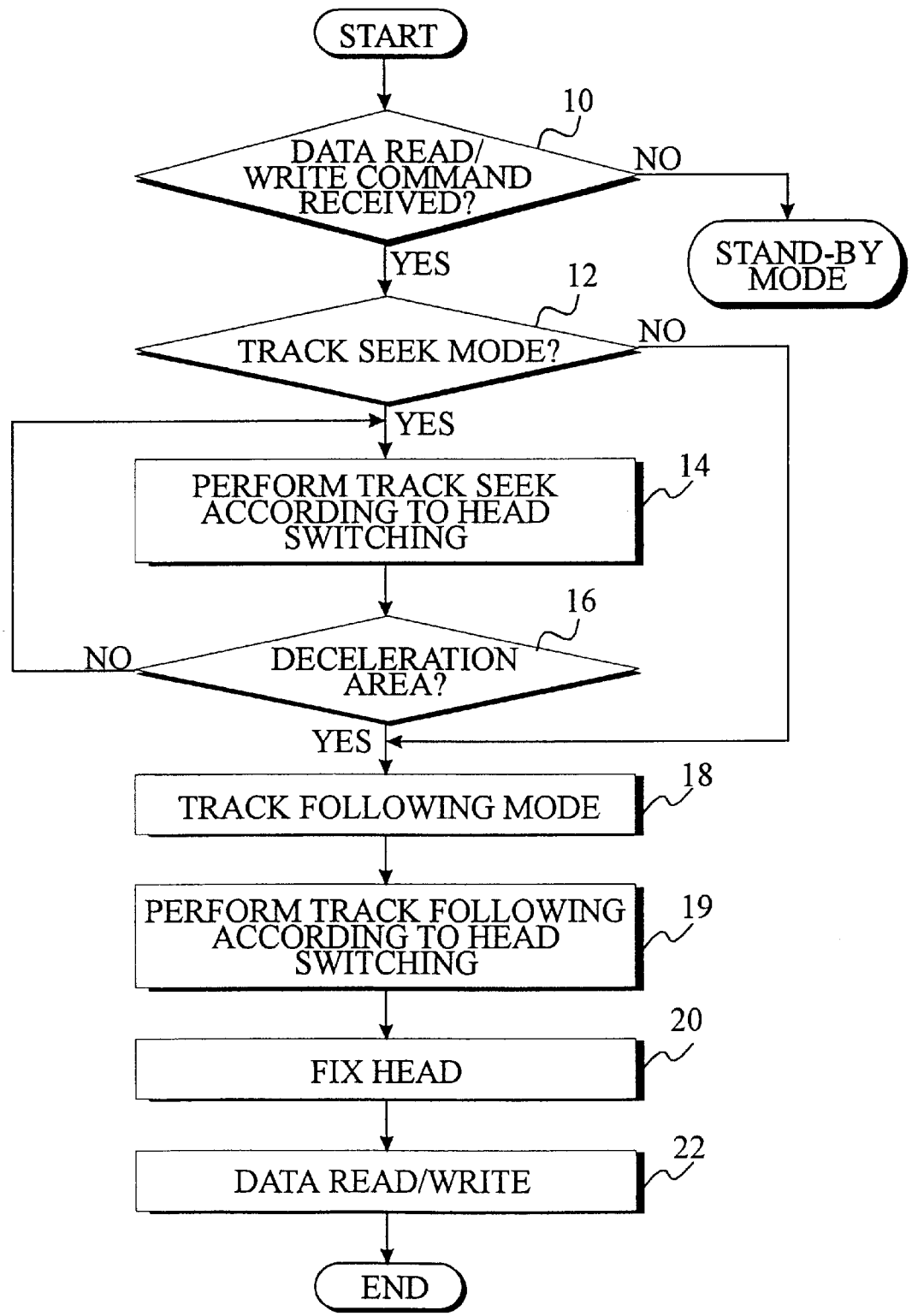
FIG. 5 is a flowchart illustrating the servo control of a servo controller according to an embodiment of the present invention.

As can be seen from FIG. 5, illustrating the servo control of the HDD which uses as a recording medium, the disk having the servo track patterns STP$\phi$ and STP 1, the microprocessor checks, in step 10, whether or not the read/write command has been received from an external device, such as the host computer. If it has been determined that the read/write command has not been received, the microprocessor continues the stand-by mode state. However, if it has been determined that the read/write command has been received, the microprocessor proceeds to step 12, and checks whether or not the head must move to the target track. That is, the microprocessor checks whether or not the track seek must be performed. If it has been determined that the track seek must be performed, the microprocessor proceeds to step 14, thereby successively switching from one head to a following head, thereby to performing the track seek. The steps of reading each track number by the head switching operation is more concretely explained as follows.

As depicted in FIG. 4, it is assumed that the present head number is indicated as the head$\phi$ and the head 4 is positioned at the position of track number$\phi$. In this case, when the command to read/write the data at the given sector of the track number N exists at the surface of the disk corresponding to head 3, the microprocessor performs the head switching operation in a sequential manner such as head$\phi$ (track number 1)→head 1 (track number 1)→head 2 (track number 2)→head 3 (track number 3)→headφ (track number 4), thereby reading the corresponding track number from the first servo track pattern STOφ and thus, recognizing the position information of the head 4. Upon the track seek, the microprocessor checks with a seek table to determine whether or not the head is being decelerated. If the head is being decelerated, the microprocessor proceeds to step 18 through step 20. That is, the track following mode is entered and track following is performed according to head switching and then the head is fixed. In other words, the microprocessor fixes the head in correspondence with the target track after reading the servo information from the first and second servo track patterns STPφ and STP 1 written on the target track by performing the track following mode, so that the servo sampling can be performed. After that, in step 22, the microprocessor performs the data read/write operation on the data sector of the target track, thereby finally completing the servo control according to the embodiment of the present invention.

Figure 6:
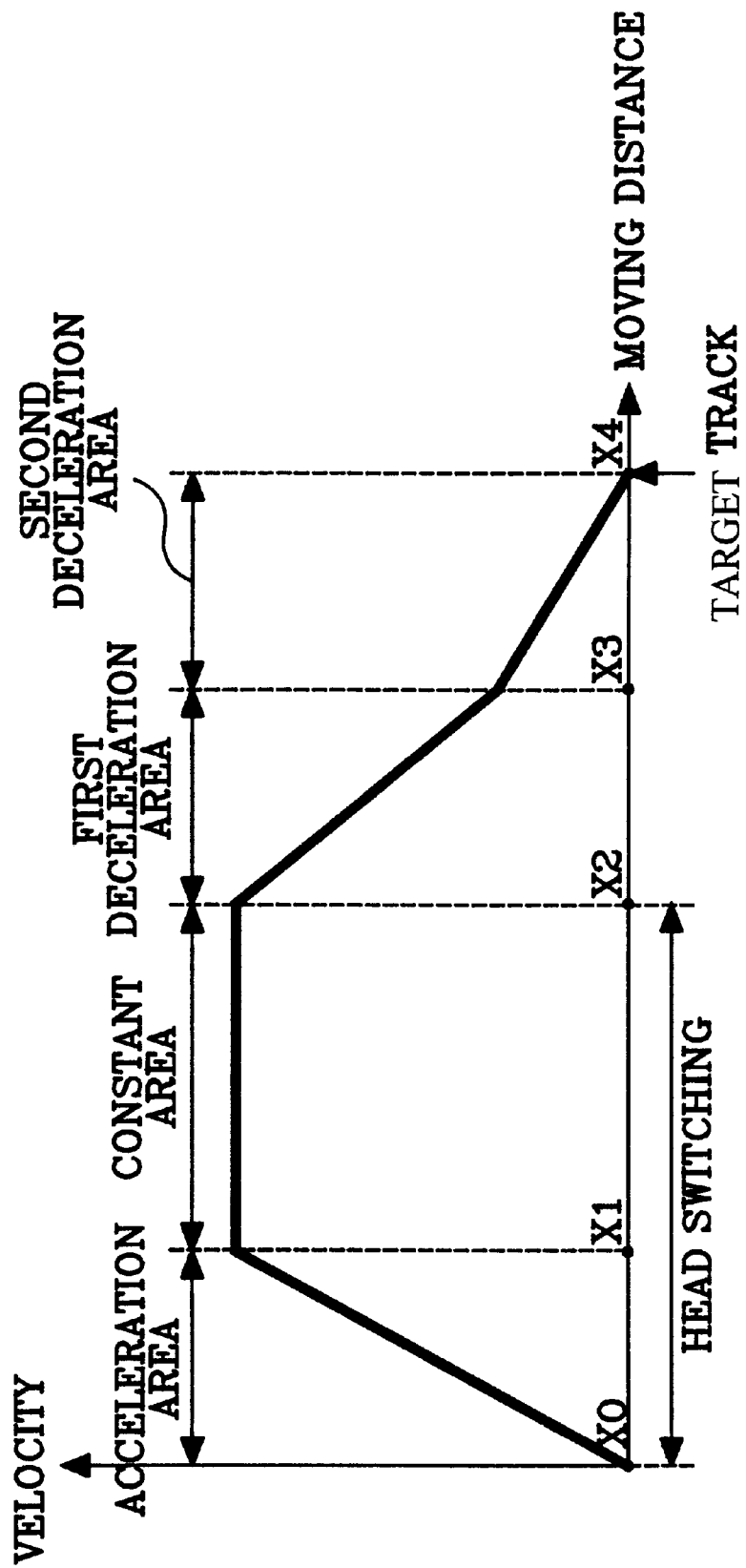
FIG. 6 illustrates a general velocity variation characteristic of the head in a track seek mode and a track following mode.

The velocity variation characteristic of the head of the HDD upon the track seek or the track following, can be seen as shown in FIG. 6. Namely, as depicted in FIG. 6, in the conventional head disk drive, the moving velocity of the head is increased in an interval between positions X0 and X1 of the track, is constant in an interval between positions X1 and X2 of the track, and is decreased in an interval between positions X3 and X4 thereof.

As may be apparent from the foregoing, the present invention has advantages in that the high capacity hard disk drive can be embodied by writing on the disk, two servo track patterns, i.e., a servo track pattern having a gray code field and a servo track pattern having no gray code field, thereby reducing the length of the servo sector. As well, upon the track seek, since the head switching operation and the head moving operation are performed at the same time, the offset for each head as well as the performance of the servo control can be improved advantageously.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A disk for a hard disk drive which uses as a recording medium, the disk having a plurality of servo sectors for each track, the disk comprising:

a first plurality of servo track patterns on each track, the number of first servo track patterns equal to the total number of servo sectors existing on each track divided by the number of heads of the hard disk drive, each of said first plurality of servo track patterns having a gray code field for providing information for each track; and a second plurality of servo track patterns on each track, the number of second servo track patterns equal to the total number of servo sectors existing on each track minus the number of said first servo track patterns, each of said second plurality of servo track patterns corresponding to said first servo track patterns with said gray code field being deleted.

2. The disk as defined in claim 1, wherein each of said first servo track patterns is comprised of:

a preamble for providing a clock synchronization upon reading servo information;

a servo address mark for providing a reference point for generating timing pulses related to a servo control;

a first PAD field, for providing a transaction margin upon reading said servo information;

servo bursts for providing positional error signals of said head;

a gray code field for providing track information for each track; and a second PAD field for providing said transaction margin upon reading said servo information;

wherein said preamble, said servo address mark, said first PAD field, said servo bursts, said gray code field, and said second PAD field are written on said first servo track patterns in a sequential manner.

3. The disk as defined in claim 2, wherein said the first servo track patterns are written on a number of said servo sectors equal to the total number of servo sectors existing on each track divided by the number of heads of the hard disk drive, and wherein said second servo track patterns are written on all other servo sectors.

* * * * *